March 26, 1935.  G. F. HARTWELL  1,995,453
COW TAIL HOLDER
Filed June 7, 1934

Inventor
George F. Hartwell.

Patented Mar. 26, 1935

1,995,453

UNITED STATES PATENT OFFICE 1,995,453

COW TAIL HOLDER

George F. Hartwell, Corvallis, Oreg.

Application June 7, 1934, Serial No. 729,511

3 Claims. (Cl. 119—105)

This invention relates to a holder for cows' tails to prevent them from switching their tails while being milked, and has for its principal object the provision of a device for the purpose stated that is extremely reasonable in cost of manufacture and that will effectively hold the cow's tail to prevent her from switching it into the milk pail or the face of the milker.

Devices for this purpose that are now in use are objectionable in that they do not yield, but rigidly engage the hind leg of the cow to which the tail is attached, resulting in irritation of the animal and in some instances adding to the difficulty of milking.

This invention has for a further object the provision of means whereby this objection may be avoided by providing an elastic member that yieldingly holds the tail attached to the hind leg of the animal, and providing means whereby the elastic member may be replaced when necessary for the effective operation of the holder.

Figure 1:
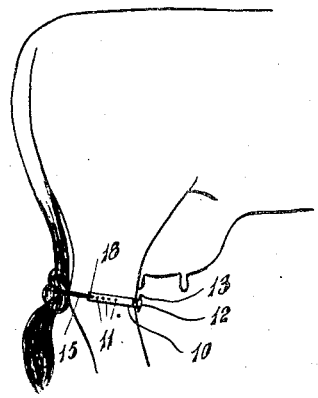
Figure 2:
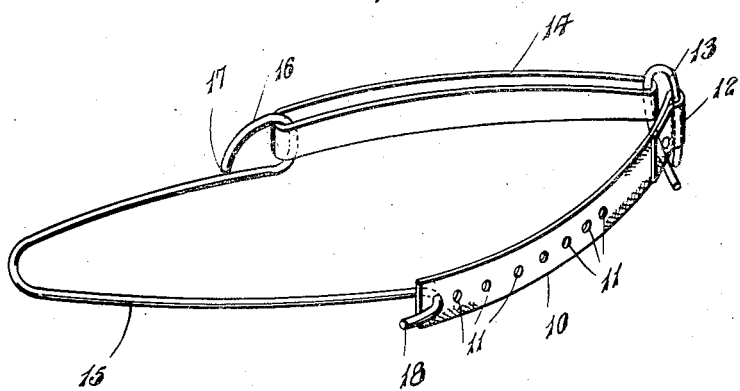

The invention will be described in detail hereinafter and will be found illustrated in the accompanying drawing, in which Figure 1 is a view of the hind quarters of a cow showing the cow tail holder in operative position, and Figure 2 is a perspective view of the holder on an enlarged scale.

Referring to the drawing the improved cow tail holder includes a flexible strap 10 of leather or the like and having a series of openings 11 therein, and provided with a returned loop 12 at one end that pivotally mounts a hook member 13, said hook engaging an endless rubber band, or other elastic member 14. 15 designates a U-shaped member preferably of a suitable gage of wire, and having one of its ends bent to form a loop 16 having its terminal slightly spaced as at 17 from the adjacent portion of the U-shaped member and engaged with the member 14. The opposite end of the U-shaped member 15 is provided with a hook end 18 that engages in one or the other of the series of openings 11 to provide a clasp to surround the hind leg of the animal as shown in Figure 1.

In use the hook member 18 is disengaged from the strap 10 and the brush of the animal's tail is wrapped one or more times on the U-shaped member 15 and then the hook 18 is engaged in an opening 11 of the strap as shown in Figure 1, thus effectively securing the tail and holding it so that it cannot be switched to annoy the milker or into the milk pail. It will be apparent that by employing the flexible strap 10 and the elastic member 14 that the holding of the tail will not irritate the animal by binding the leg, as the flexibility of strap 10 and the yielding nature of the rubber band will avoid irritation, and as the engaging means for the elastic member are the hook 13 and the bent loop 16, the rubber band may be replaced when necessary in order to make the device effective in operation.

I claim as my invention:

1. In a cow tail holder, a strap of flexible material, an elastic member secured to one end of said strap, and a U-shaped member connecting the free end of said strap and the elastic member.

2. In a cow tail holder, a strap of flexible material having a series of openings therein, a hook member secured to one end of said strap, an elastic member engaging said hook, a U-shaped member engaged at one of its ends with said elastic member, and a hook on the other end of said U-shaped member and engageable in a selected opening in said strap.

3. In a cow tail holder, a strap of flexible material having a series of openings therein, a hook member pivotally secured to the strap, an endless elastic band engaging said hook, a U-shaped member having a loop on one end engaging said band, and a hook on the opposite end of said U-shaped member and engageable in one of the openings in said strap.

GEORGE F. HARTWELL.